OR   3,872,858

United States Patent [19]
Hudson et al.

[11] 3,872,858
[45] Mar. 25, 1975

[54] ECHOENCEPHALOGRAPH

[75] Inventors: Arthur C. Hudson; Brian J. Trollope, both of Ottawa, Ontario, Canada

[73] Assignee: Canadian Patents and Development limited, Ottawa, Ontario, Canada

[22] Filed: Aug. 8, 1973

[21] Appl. No.: 386,590

[30] Foreign Application Priority Data
May 29, 1973 Canada................. 172609

[52] U.S. Cl................. 128/2 V, 73/67.9
[51] Int. Cl............................ A61b 10/00
[58] Field of Search..... 128/2 V, 2 R, 2.05 Z, 24 A; 73/67.7–67.9

[56] References Cited
UNITED STATES PATENTS

| | | | |
|---|---|---|---|
| 3,323,512 | 6/1967 | Clynes | 128/2 V |
| 3,372,576 | 3/1968 | Dory | 73/67.9 |
| 3,554,186 | 1/1971 | Leksell et al. | 128/2 V |
| 3,565,057 | 2/1971 | Hart | 73/67.7 X |
| 3,673,325 | 6/1972 | Uphoff | 73/67.7 X |
| 3,681,977 | 8/1972 | Wendt et al. | 128/2 V X |
| 3,688,565 | 9/1972 | Brech | 73/67.9 |
| 3,713,329 | 1/1973 | Munger | 128/2 V X |
| 3,792,613 | 2/1974 | Couture | 73/67.9 |

*Primary Examiner*—Kyle L. Howell
*Attorney, Agent, or Firm*—Edward Rymek

[57] ABSTRACT

This echoencephalograph applies an ultrasonic pulse to the patient's head, the pulse travels to a predetermined structure and is partially reflected as an echo pulse. The travel time is determined and a digital display indicates the distance from the outside of the patient's head to the predetermined structure. The apparatus includes a variable gain amplifier, a gating circuit to pass only the echo pulses from a particular region of the head and an echo sensor which responds to echo pulses of a predetermined amplitude. It also includes a ramp generator which adjusts the amplifier gain to compensate for echo pulse attenuation as it travels through the tissue, and further includes a slow ramp generator which increases the amplifier gain for successive echo pulses assuring the sensing of the strongest echo from the predetermined region. This echoencephalograph is preferably used in the initial diagnosis of midline structure lateral shift.

14 Claims, 6 Drawing Figures

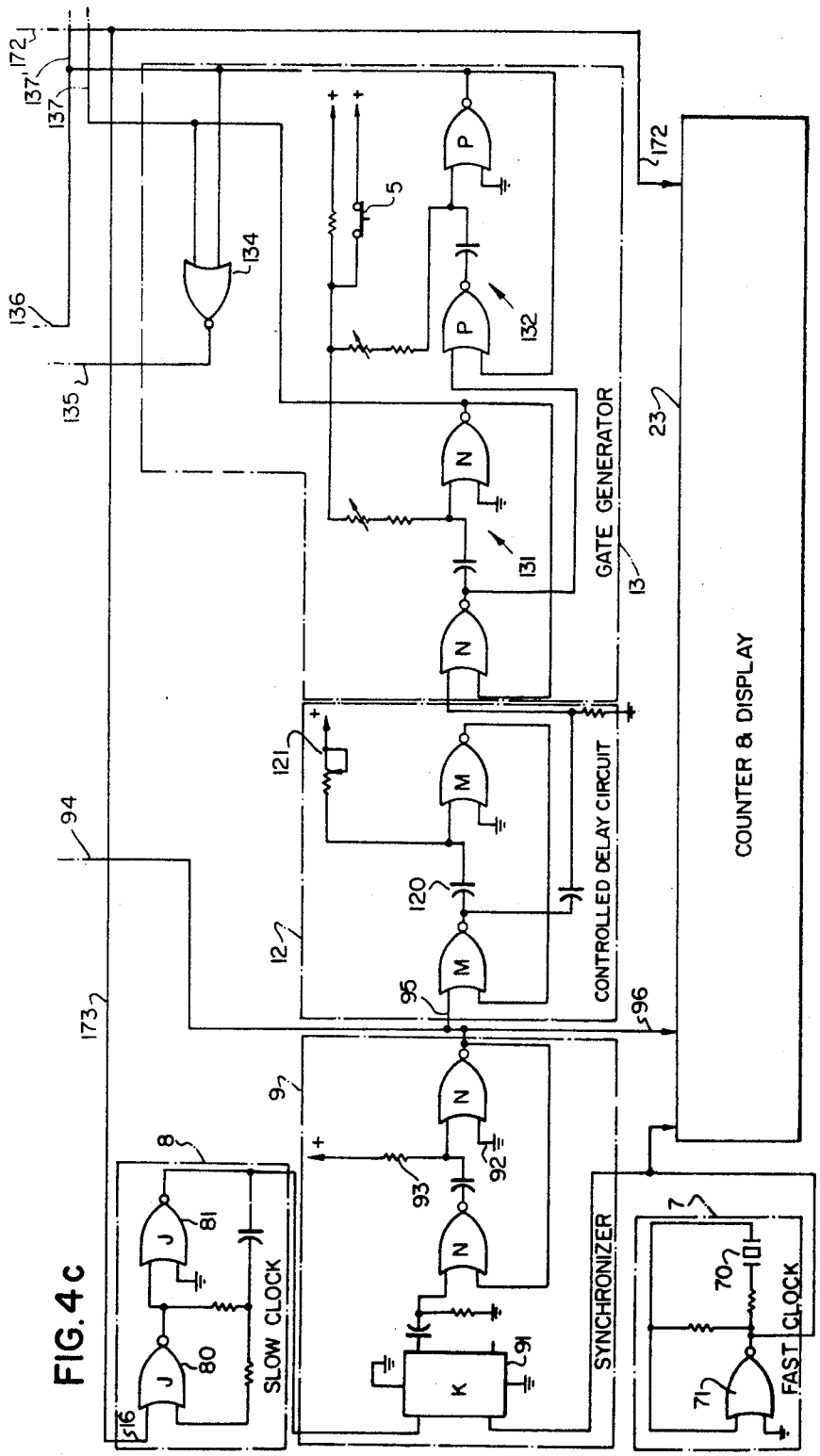

ECHOENCEPHALOGRAPH

This invention relates to a compact echoencephalograph for determining the position of interface structure within a body and in particular the position of the midline structure within a patient's head by detecting and measuring the travel time of ultrasonic energy pulses to the structures and echo pulses from these structures.

Ultrasonic detectors as well as, encephalographs are not in themselves a new diagnostic tool. In some devices complex switching systems have been devised, using two transducer devices for transmitting ultrasonic pulses through the brain from the left and right sides of the head and detecting pulses which either have traversed the brain or have returned as echoes from the midline structure. The detected pulses are then displayed on a CRT or are used in making an automatic calculation of the midline location. Such systems are not in general use by the medical profession in offices, clinics, ambulances or on house calls, but are usually reserved for specialized use in hospital laboratories.

This invention has as an object, the provision of an inexpensive, compact and simple instrument which would have widespread use in initial diagnosis of midline lateral shift, width of the cerebral third ventricle and the like.

It is another object of the invention to provide an ultrasonic encephalograph system having improved precision in readout.

According to the invention, the head width of the patient is first measured using either a mechanical caliper or ultrasonic pulse travel time measurements. The distance to the theoretical position of the midline structure (one-half of the head width) or other structure under consideration is used to set a gating device within the echoencephalograph so that the only echoes detected will be those which originate within approximately 16 mm either way of the median plane of the head or the theoretical location of that structure. In addition, the echoes received are processed in such a manner as to read out only the strongest echo from this region, taking into consideration echo amplitude attenuation which is directly proportional to the distance the echo travels through the brain.

According to a further feature of the invention, a single transducer is used to make readings of a predetermined structure, with separate readings being taken from the left and the right side of the head.

According to a further feature of the invention, provision is made for precise readings on either infants or adults since it has been determined that the ultrasonic transmission characteristics vary between these two groups.

According to a further feature of this invention, a digital readout is provided which is displayed for a period of time when the strongest echo is detected.

These and other objects, features and advantages will become more apparent from the following description.

In the accompanying drawings.

Figure 3:
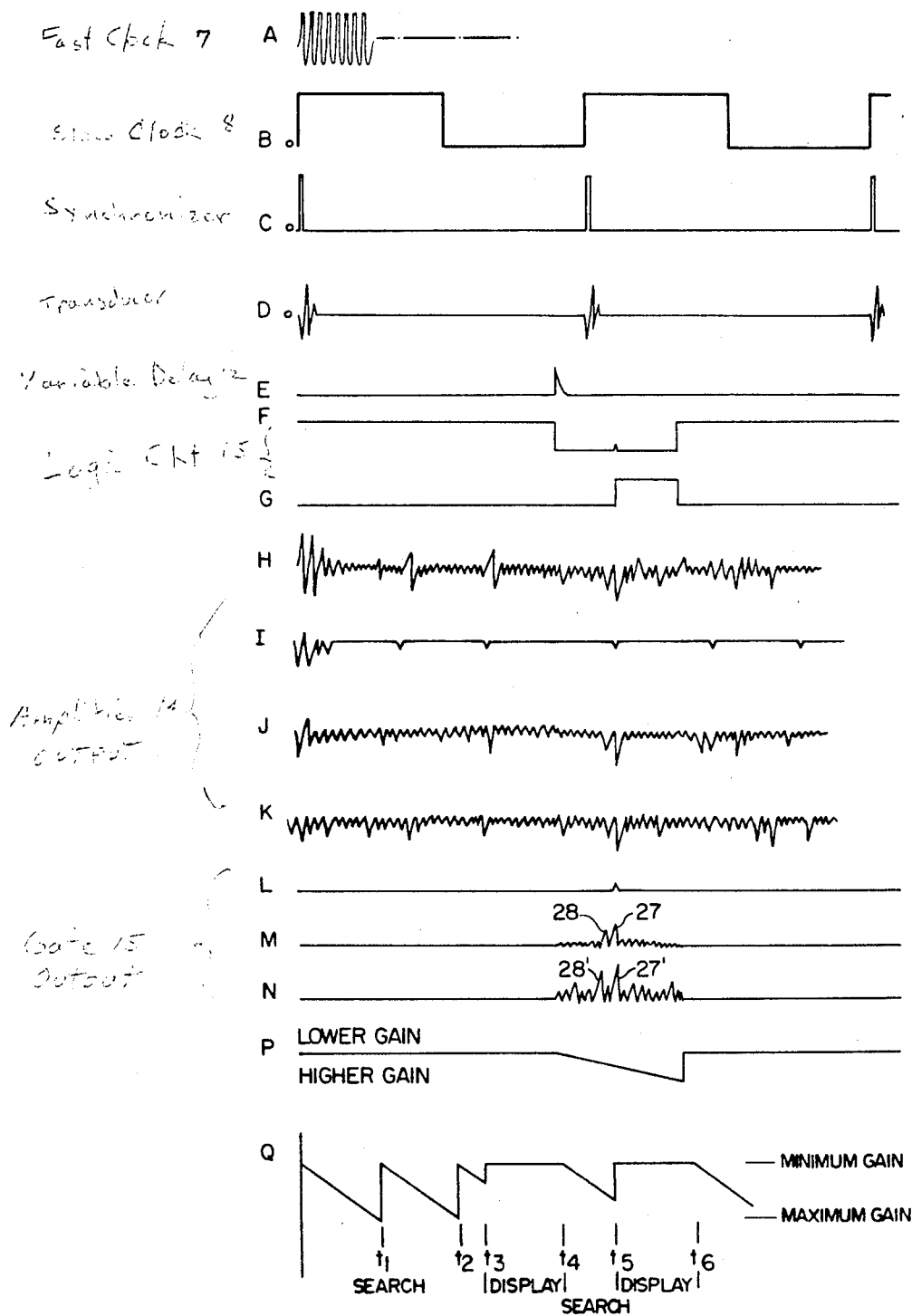
Figure 4A:
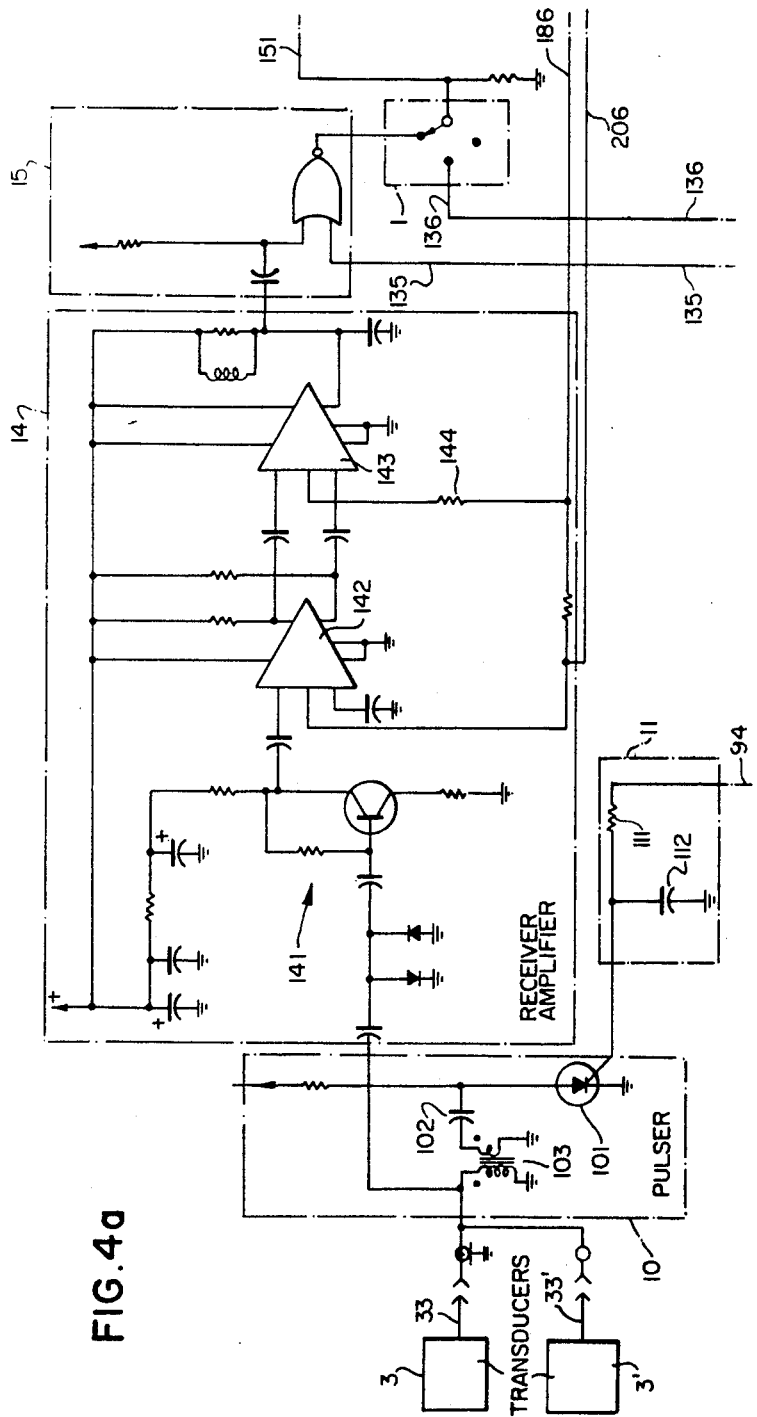
Figure 4B:
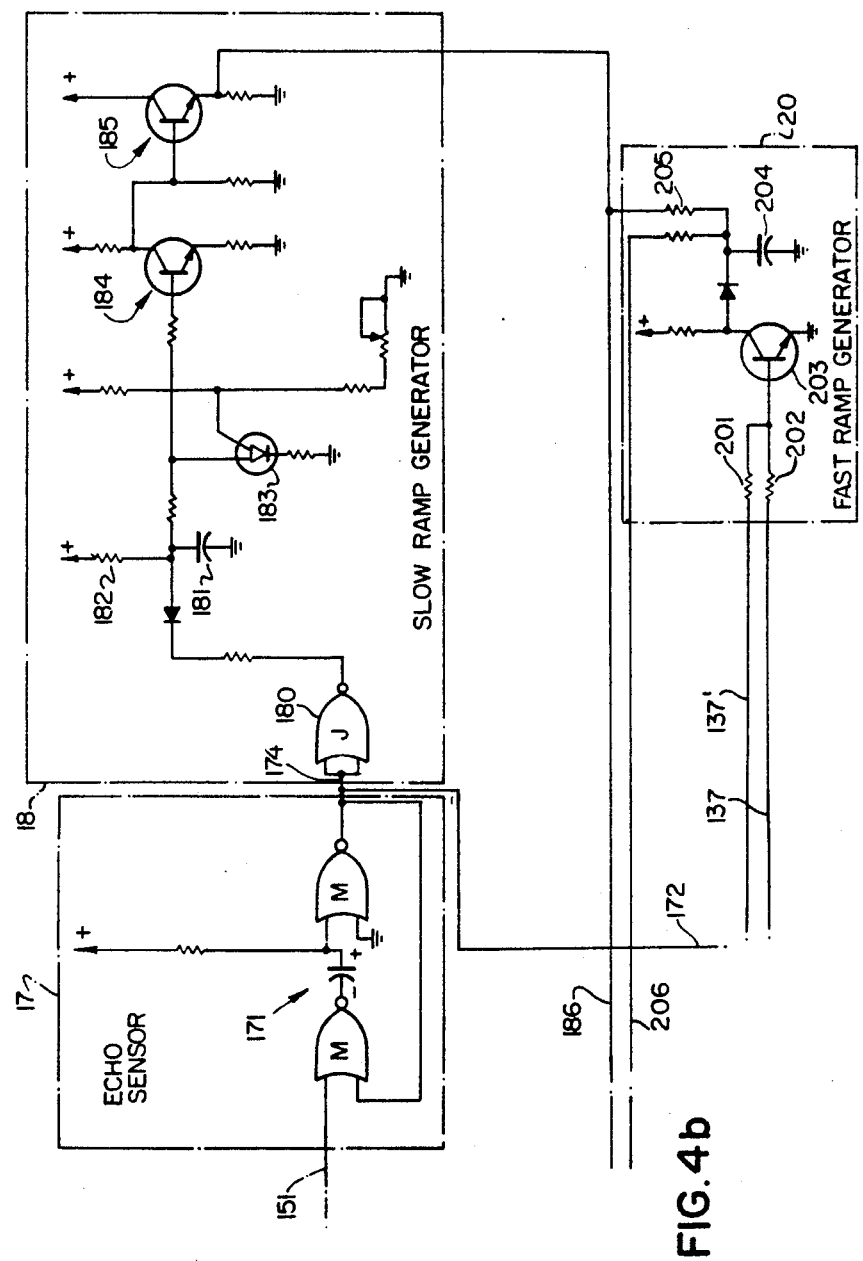

FIG. 3A to Q is a series of waveforms produced at various points in the block diagram, and FIG. 4 is a circuit diagram of the echoencephalograph, it consists of FIGS. 4a, 4b and 4c.

Figure 1:
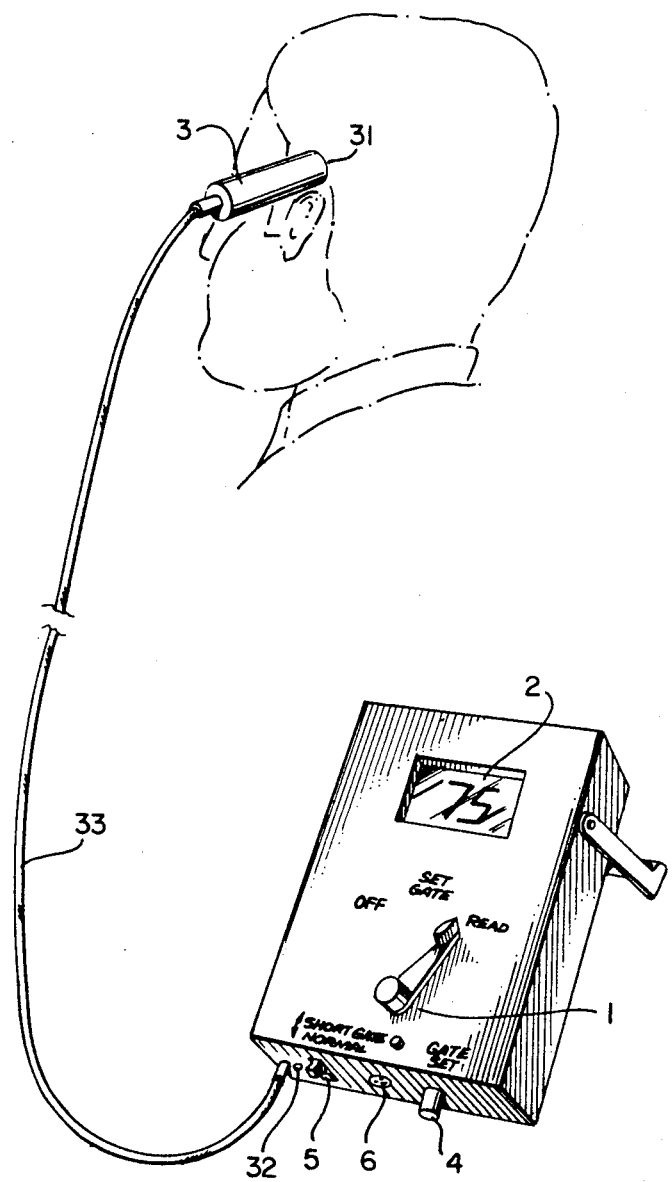
FIG. 1 is an isometric view of the echoencephalograph.

FIG. 1 illustrates, in isometric view, the exterior structure of the echoencephalograph with self-contained rechargeable batteries. The device includes a three position control switch 1, having an "off" position, a "set gate" position and a "read" position; a luminous display 2 visible through a window in the casing; an ultrasonic transducer 3 connected to the device by a flexible coaxial line 33 and shown in acoustic contact with the temporal region 31 of a subject above his ear; a socket 32 to which a second ultrasonic transducer may be connected; a gate control 4 used to vary the time of occurence of the gate; a switch 5 used to select a short gate if desired; and a socket 6 for connection to a battery charger.

To use the compact echoencephalograph, the operator first measures the half-head diameter of the subject at the point, just above the ear, where echoencephalography is conventionally carried out. This distance is also sometimes called theoretical midline distance. In the field of echoencephalography, some doctors prefer a caliper method to establish the theoretical midline location, wherein a special pair of calipers, calibrated to half diameter in millimeters, or ordinary medical calipers, may be used. Other doctors place less importance on this, preferring to diagnose midline shift purely on the difference of echoing time from each side of the patient. A third group prefer an ultrasonic method of establishing the theoretical midline, that is to measure the time required for a transmitted ultrasonic pulse to traverse the head. This method is well known and switching circuits are built into conventional echoencephalographs for this purpose. These switching circuits disconnect the receiver from the transmitting transducer, and reconnect it to the second transducer.

Briefly, the caliper method has the advantage that calipers may be cheaper than a second transducer, or they may already be available. The ultrasonic, or two-transducer reading has the advantage that, for example, when plotted on the same histogram with the echo readings from each side, it will be in exactly the correct position relative to the echo readings, regardless of any discrepancies which are introduced by, for example, a skull of unusual thickness. In fact, most sources of error which would cause a discrepancy between a purely mechanical (caliper) reading of distance and an ultrasonic reading, will affect equally the echoes and the through pulse, and thus will cancel out when one is primarily interested in midline shift from the theoretical centralized position.

In the disclosed device, the theoretical midline is located by the ultrasonic method in the following manner. The control switch 1 is switched to "set gate". The "gate set" control 4 is adjusted to approximately half of the theoretical head diameter, this value appears on display 2. This theoretical midline may be estimated since it is usually at about 75 mm for an adult or it may be measured using calipers if a double check is desired. The control switch 1, is switched to "read." After applying the usual acoustic coupling medium, such as glycerine or any of various commercial products to the faces of the two transducers, the first transducer 3 is placed on one side of the subject's head as shown in FIG. 1. The second transducer, which may be identical to the first or which may, for the sake of economy, be of lower quality, is connected to socket 32 and placed in a similar manner on the other side of the subject's head. By slight rocking and searching, a persistent signal is obtained and the theoretical midline distance in millimeters will appear on the luminous display 2.

The control switch 1 is switched back to the "set gate" position and the gate setting is corrected to the theoretical half-head diameter which reads to the nearest millimeter. This establishes a region of approximately 32 mm in width, centralized within the subject's head, for which the instrument is sensitive to echoes. Under special circumstances the operator may choose to deliberately offset this region, for example by setting the gate reading ten millimeters higher than the measured half-head diameter of the subject. This might be done, for example, when he wishes particularly to find lateral ventricle echoes, or if he suspected a haematoma. While for conciseness it is not shown in the block diagram (FIG. 2), means are provided including the switch 5, for reducing the 32 millimeters mentioned above to about 20 millimeters. This is particularly useful for examining infants, in order to exclude lateral ventricle echoes.

The control switch 1 is now switched to "read," and the instrument is ready to take actual midline echo readings using only one transducer 3. Acoustic coupling medium is applied to the face of the transducer 3 and the transducer is placed on the subject's head as shown in FIG. 1. With slight rocking and searching, a persistent echo is obtained. The presence of the echo is indicated by the illumination of the display for periods of about two second (the display mode) interspersed with periods of perhaps one-half second when the display is dark (the search mode). Without straying too far from this transducer location the operator rocks and displaces the transducer, at the same time remembering or preferably recording the successive readings. Acoustic contact is maintained at all times. Typically fifty readings are made from one side. It is commonly believed that with adequate operator skill, the majority of these readings will originate from the walls of the third ventricle. Often a histogram is plotted on a prepared form, the readings represent the distance in millimeters of tissue from the point of application of the transducer to the echoing structure. Similar readings, taken with the transducer placed on the other side of the patient's head, are also plotted on the same histogram, but preferably in a different color. With skill and experience, the shoulders of each of the two histograms will indicate the width of the third ventricle, an important diagnostic parameter. The internal operation of one embodiment of the invention will now be described in conjunction with FIG. 2 and the waveforms illustrated in FIG. 3. The letters attached to the outputs of the blocks on FIG. 2 correspond to the waveforms in FIG. 3 which are not to scale relative to one another.

The echoencephalograph has two basic operating positions, the "read" position and the "set gate" position. The device will first be described as it operates in the "read" position. The device includes a fast clock 7 which runs continuously at a frequency in the order of 800 kHz and has a waveform as illustrated in FIG. 3-A. The clock 7 feeds pulses to the counter 23 as well as to the synchronizer 9. A second clock, a slow clock 8 also runs continuously unless it is inhibited by the echo sensor 17 as will be described later. It has a frequency of 20 hz with a waveform as shown in FIG. 3-B. Clock 8 also feeds the synchronizer 9. As clock 8 makes a positive going transition, the synchronizer 9 is set, and as clock 7 makes a positive going transition, the synchronizer provides a positive pulse as shown in FIG. 3-C. A synchronizer pulse is thus produced for every positive going transition of clock 8. The synchronizer pulse on line 96 resets the counter 23 to zero and after a short delay, as represented by block 25, the counter 23 starts counting the cycles of fast clock 7. The output of synchronizer 9 is also connected through a delay network 11 by line 94 to a pulser 10 which generates a sharp high voltage spike as shown in 3-D used to shock excite either one transducer 3 for taking midline readings, or two transducers connected in parallel if head diameter measurements are being taken. The synchronizer is also fed through line 95 to a variable delay circuit 12 whose delay, about 70 microseconds, is determined by the setting of gate set control 4 (FIG. 1). This delay, as shown in FIG. 3-E, will determine the position of the gating signal. The output pulse from delay circuit 12 controls the gate generator 13 which provides two output signals, the first as illustrated in FIG. 3-F is approximately 40 microseconds in width and drives both the logic circuit 15 through line 135 and the fast ramp generator 20 through line 137 whose operation will be described below. The second as illustrated in FIG. 3-G is approximately half the width of the first and starts at approximately the mid-point of the gating signal. It is fed to switch 1 through line 136 and is used in the gate setting operation, described below. As described above, a sharp voltage spike shock excites transducer 3 which produces an ultrasonic pulse. This pulse travels through the skull and brain tissue and is partially reflected from the various interfaces in the head including the midline structures. These echoes are picked up by the transducer 3 and converted to electrical signals. These signals are directed to a gain controllable receiver-amplifier. A typical amplifier input is shown in FIG. 3-H. This amplifier may have a gain which is controllable between about 30 and 90 decibels. The amplifier output may be as shown in FIG. 3-I,J,K depending on its gain. It is broadly tuned to the resonant frequency of the transducer 3. Further, the amplifier is gain controlled by both slow and fast sweep circuits as described below. The amplifier output is fed to one of the inputs of a gate 15, which is controlled by the gate generator 13. The gate is set to be responsive to negative going signals which occur in the gated region only. The output of the gate 15 is an inversion of the receiver output during the gating period and is essentially zero otherwise. This is illustrated in FIG. 3-L, M and N where the amplitude of the output of gate 15 depends on the amplitude of the input signal from the amplifier. The gate output feeds an echo sensor 17 whose output goes high for approximately 2 seconds when it receives an input greater than its threshold. Its output controls the counter 23, the slow clock 8 and resets the slow ramp generator 18. The positive voltage on line 172 stops the counter 23 and activates the display, which shows the state of the counter, that is the number of clock cycles which have occured since the counter 23 was allowed to start counting from zero. The same positive voltage stops the slow clock 8 through line 173.

The instrument is designed for a "standard" adult, who has a known skull thickness, known head diameter, and known velocities of propagation of longitudinal ultrasonic waves in skull and in tissue. The count as determined by delay circuit 25, but particularly by the choice of the fast clock frequency is arranged so that, for the standard adult, the time required for the ultrasonic pulse to enter the head at the point of application of the transducer, traverse the skull and tissue, reach the midline of the head, be reflected and return to the transducer is exactly the time required to let the counter 23 reach the correct value, that is the midline position in millimeters.

The receiver amplifier 14 has two gain controls, neither of which is manual. The first gain control is very slow repetitive ramp, or sawtooth, which increases the gain from minimum towards maximum over a period of approximately one second if undisturbed. The output generated is shown in FIG. 30 wherein the generator 18 is undisturbed up to $t_3$ generating ramps with 1 second periods. At time $t_3$ and $t_5$, the ramp generator 18 is interrupted for approximately 2 seconds by a signal from the echo sensor 17. This ramp waveform is generated by the slow ramp generator 18 and fed to the receiver gain control input through the line 136. When the echo sensor's output goes high, the line 174 feeds a signal to the slow ramp generator 18 which drives and holds it to its starting of minimum gain level.

Assume that the slow ramp generator 18 which has a ramp voltage as shown by 3-Q happens to have a fairly high output voltage, the gain of the amplifier will thus be low, the output of gate 15 might be as shown by 3-L, this output is too small to actuate the echo sensor 17, even though the pulser is firing and echoes are reaching the receiver amplifier 14. Five or 6 pulses later, that is to say perhaps 300 milliseconds later, the ramp voltage is lower, consequently the receiver gain is higher, the gate output is now illustrated by M, echo 27, but not echo 28, is strong enough to activate the echo sensor. At the instant of occurrence of echo 27 the counter is stopped by the voltage on line 172, and the display is activated for about two seconds, showing the number in the counter, which is the distance in millimeters from the point of application of the transducer to the strongest echo in the gate region, namely echo 27. Note that echo 28 is not strong enough to operate the echo sensor 17. At the same time, line 174 restores the ramp generator to its minimum gain position, and holds it there during the display regime, so that for the next reading, the receiver starts at minimum gain. It will be appreciated that, since for a first reading the slow ramp voltage 3-Q is at a random level, it would be possible that an echo such as echo 28, as shown on 3-N, though not the strongest echo, would nevertheless be strong enough to operate the echo sensor. Since it precedes the desired (strongest) echo 27' in time, it would do so, giving an erroneous reading. For this reason, the first of the fifty of so readings which is obtained after making acoustic contact is always ignored. In fact, many operators prefer not to record the first fifteen or so readings, in order to get the "feel" of the third ventricle although this is to satisfy human criteria, not those of the apparatus.

It will be realized that one way has been described to electronically select the strongest echo. Other ways will be obvious to those skilled in electronics. For example the slow ramp could be dispensed with, and in its place the receiver gain could be continuously under the control of a conventional automatic gain control circuit, whose input was restricted to those echoes within the gate. Parameters of the circuit could be chosen so that as long as there was say, one decibel difference between the largest and the next largest echo, the receiver gain would be reduced so that only the largest was sufficiently strong at the gate output to activate the echo sensor.

Further, in order to compensate for the attenuation of the pulses and the echoes as they travel through the subject's head in the in the region under study, the fast ramp voltage as illustrated by 3-P is controlled by gating signal illustrated by 3-F and is applied to the amplifier through line 206.

Figure 2:
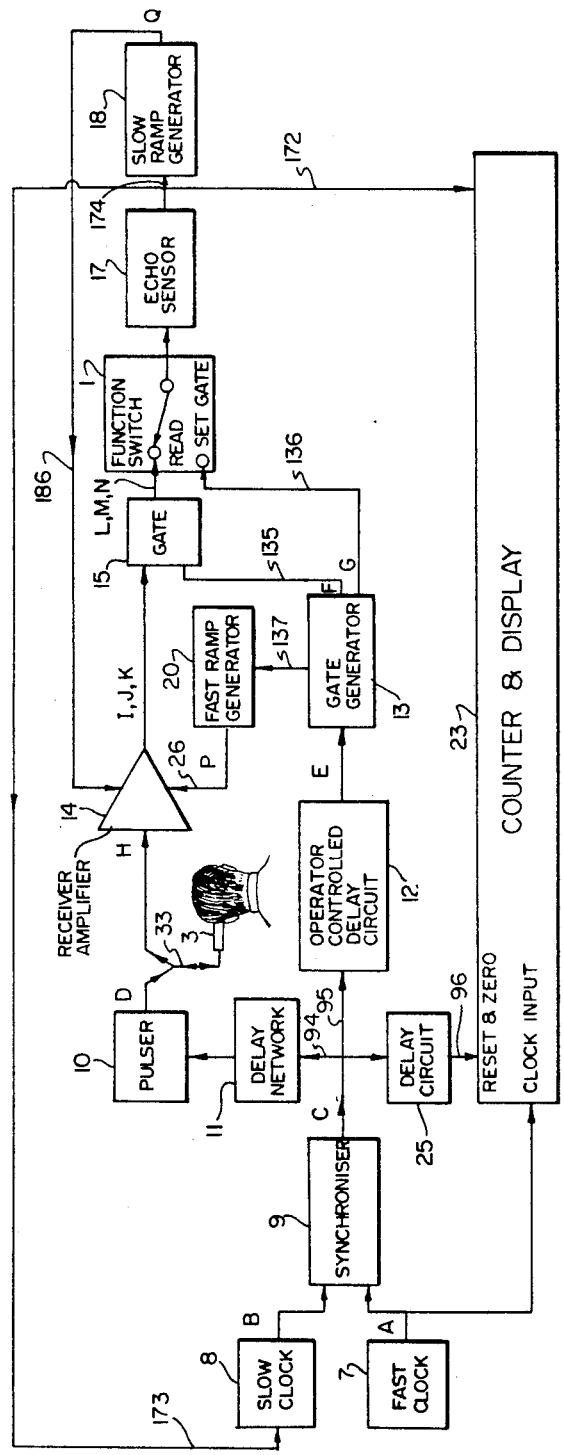
FIG. 2 is a block diagram of the preferred embodiment.

In FIG. 2, block 23 represents a counter and display, containing a conventional 2½ digit decimal counter, with conventional decoders, buffers and seven-segment light emitting diode display devices.

Subject to the controls described, the counter counts cycles of the fast clock 7. When the echo out-put is high, line 172 activates the display indicators and at the same time holds the counter, so that whatever number is in the counter is visible. After about two seconds, the echo sensor output automatically goes low, the counter is unlocked and the display is extinguished.

Each time that the output of the synchronizer 9 goes high, line 96 resets the counter 23 to zero, then after a short delay determined by the delay circuit 25, the line 96 goes low and permits the counter to start counting.

When the device is set in the "set gate" position, the echo sensor receives the pulse illustrated in FIG. 3-G from the gate generator 13 through switch 1. The counter receives a pulse on line 172 as previously described and displays the count produced by fast clock 7 which is representative of the delay time of circuit 12. This operation is cyclically repeated and the controlled delay circuit 12 is adjusted until the correct half-head diameter is indicated.

When measuring the half-head diameter by the ultrasonic method, two transducers are connected in parallel to pulser 10. Both transducers are excited simultaneously and approximately 100 microseconds later for an adult, both transducers receive the impulse which has traversed the head. Both received impulses are combined in the receiver even though the frequency will not in general be identical, and the resulting receiver output will operate the echo-sensor in exactly the manner previously described for an echo. Real echos will, of course, be present from each transducer, these echos having originated from reflection of the pulse transmitted by that transducer, however, because it automatically selects the strongest echo, these echoes cause no harm, since they are of the order of 37 decibels weaker than the pulse which has traversed the head.

One form which the echoencephalograph might take will be described in conjunction with the circuit diagram in FIG. 4 which is intended to give a better understanding of the concepts involved and not to limit the scope of the invention. The circuits outlined in FIG. 4 by broken lines carry the same reference numbers as the corresponding blocks in FIG. 2.

The fast clock 7 is a crystal 70 controlled oscillator where for the necessary amplification a "CMOS" two-input nor gate 71 is used as an amplifying inverter. The slow clock 8 is a conventional astable multivibrator circuit having two CMOS two-input nor gates (80, 81) as amplifying inverters and the RC circuit set to produce a 20 hz oscillation. One of the gate 80 inputs is connected to line 173 for the purpose of inhibiting this clock during the display mode. The synchronizer 9 includes a type D flip-flop 91, having its clock input driven by the fast clock 7 and its D input driven by the slow clock 8. Its output feeds a monostable multivibrator 92, the RC circuit 93 time constant of which is set to produce an output pulse of approximately 3 microseconds in duration. This pulse is fed to the pulser circuit 10 through line 94, to the controlled delay circuit 12 through line 95 and to the counter and display through line 96. The pulser 10 is a conventional pulsing circuit including a silicon-controlled rectifier 101 which rapidly discharges a capacitor 102 through the primary of a transformer 103. The transducers 3, 3, are connected in parallel to the secondary of the transformer. The delay network 11 consists of a resistor 111 capacitor 112 network in the SCR gate circuit. The delay is provided by the time required for the capacitor voltage to reach the SCR firing voltage.

The controlled delay circuit 12 is a monostable multivibrator. The pulse width is controlled by the RC circuit including capacitor 120 and variable resistor 121 which is controlled by control 4 (FIG. 1). The gate generator 13 includes two identical monostable multivibrators, 131, 132, the first 131 is driven by the output from the delay circuit 12 and the second 132 is driven by the first 131. The generator 13 also includes a nor gate 134 driven by the two multivibrators resulting in a complete gate signal on line 135. This method of gate generation develops the "middle transition" on line 136 which is the output of multivibrator 132. A third output on lines 137 and 137' which are the outputs of multivibrators 131 and 132 respectively, are fed to the fast ramp generator 20. A further feature in the gate generator includes a switch 5 which switches the source voltage from a low to a higher voltage thus providing a gate of narrower width.

The receiver amplifier 14 which is connected to the transducers consists of a common emitter transistor preamplifier 141 broadly tuned to the resonant frequency of the transducer and drives two monolithic integrated circuit linear amplifiers 142, 143 in cascade. It feeds gate 15, which is a RCA CMOS digital integrated circuit Cd4001A. For greater clarity it can be said that the two-input gate 15 gives a positive going output only when two conditions are met simultaneously. Firstly, the (low) gate generated by the gate generator 13 is present on one input of the two-input gate 15, and secondly, a negative-going signal is present on the other input. The output from gate 15 is fed to the echo sensor 17 through switch 1 on line 151. The echo sensor 17 includes a monostable multivibrator 171 with a time constant of approximately 2 seconds. The echo sensor 17 output controls the counter and display 23 along line 172 and the slow clock 16 along line 173 as previously described. Finally, the echo sensor is connected to the slow ramp generator 18 by line 174. The slow ramp generator 18 includes a capacitor 181 charging through a resistance 182, with its recycling provided either by the firing of a programmable unijunction 183 or by a pulse from echo sensor 17 through an invertor 180, whichever comes first. The slow ramp generator further includes a common emitter inverting amplifier 184 and an emitter follower 185, whose output is connected through resistances to the gain control terminals of the monolithic I.C. amplifiers 142, 143 in the receiver-amplifier 14 by line 186.

The input pulses on lines 137 and 137' for the fast ramp generator 20 are combined through resistors 201 and 202 to control transistor 203. This allows capacitor 204 to discharge through resistor 205 to generate a ramp voltage on line 206. The first ramp generator 20 has a special feature which is related to the gain control characteristic of the monolithic IC amplifiers. Since the fast swept gain is connected to a gain control element which is already being controlled by the slow ramp generator 18, and since this element becomes less sensitive for incremental changes in current as the gain is increased, a swept gain voltage waveform which becomes steeper as the slow ramp generator tends to a higher gain condition is needed. This is achieved by deriving the voltage for the fast ramp integrating capacitor from the slow ramp output voltage on line 186.

The counter and display 23, is not described in detail, since it is conventional and descriptions of similar counter-display circuits may be found for example in RCA Corporation Application Note ICAN-6733.

In the block diagram FIG. 2, the synchronizer 9 and the delay circuit 25 are shown separately for the purposes of explanation. Actually the type D flip-flop in the synchronizer 9 drives a monostable one-shot 92 whose output immediately goes high, driving the delay networks 11 and 12 immediately. This same output immediately resets the clock to zero through line 96. The delay function, represented in FIG. 2 by block 25, is provided by this monostable one-shot on line 96 in that it is inherent to the counter portion of 23 that it cannot start counting until the monostable one-shot relaxes to its quiescent state.

An important aspect of our device will now be described, this refers particularly to the choice of frequency for the fast clock 7, and the parameters of the delay network 11, which delays the firing of the transducer, and the parameters of the delay circuit 25, which determines the time at which the counter starts to count.

If the human head were homogeneous, from the point of view of velocity of propagation of longitudinal ultrasonic energy, and if further all subjects had the same velocity, the design of instruments such as this, which are calibrated in millimeters of tissue, would be simpler. In particular, delay networks 11 and 25 could be estimated, and the frequency of the fast clock chosen according to the following formula:

Clock frequency in megahertz = (Ultrasonic Velocity in mm/usec/2)

where "2" arises because the energy must both go and return from the transducer to the echo.

In reality, there are large velocity differences within the head, notably the velocity in bone is more than twice that in tissue. Further the skull thickness, and hence the length of path in bone, varies significantly between individuals, even adults. When infants are included, and echoencephalography is very widely used for infants because - for example of the prevalence of hydrocephalus, the variations of individuals' parameters become much greater. It has been determined in fact that there is a relatively consistent difference in velocity between infants and adults, and it is not believed that this is limited to the skull. A 'standard adult' and a 'standard infant' are defined. Of course a manual switch 'infant/adult' could be included which would appropriately alter the fast clock frequency or the delays (11, 25) or both. However a better method, which may be referred to as two-point tracking, by analogy with terminology from the electronic art has been found. The parameters for a standard adult and a standard infant are established. Two simultaneous equations, one for the adult and one for the infant, each of which insists that the display read correctly for a perfectly centred midline, are established, the unknowns are the fast clock frequency and the difference in time, (determined by delays 11 and 25) between the firing and the start of the count. This difference can be positive or negative. The solution of these two simultaneous equations yields values for the fast clock frequency and the previously mentioned delay difference. These values are used in the echoencephalograph and then the instrument is correct for an unshifted standard adult and an unshifted standard infant. It is found that under these conditions, for real subjects of any age, the caliper reading and the average of the midline position as determined from each side usually agree within two millimeters. A disadvantage of this method of coping with the inhomogeneity and variability between subjects of the acoustic properties of human heads is that, while an unshifted standard adult is read correctly, a subject who is 'standard' except for a shift will have the displacement or shift component of the reading in error by a certain percentage which is related to the fact that the fast clock frequency must be modified somewhat from its basic value. In practice this discrepancy, amounting to about three percent or less, is of negligible significance.

One disadvantage of echoencephalograph such as the present one is that if a quantity of acoustic couplant is on the transducer face, multiple reverberations of the ultrasonic pulse within this material can finally yield a spurious echo occuring within the gate, this then produces a fallacious reading. This effect is minimized by keeping the transducer in good acoustic contact with the head, or alternatively by ignoring any readings which are made when good acoustic coupling is not obtained.

An advantage of the present echoencephalograph over conventional devices, particularly those employing a cathode ray tube for display is that the average dose of ultrasonic energy applied to the subject is from ten to one hundred times lower than this device. This comes about in two ways, firstly it is common in echoencephalographs which use a CRT to employ a pulse repetitition frequency of the order of 500 Hertz, otherwise the display is too dim. The present device functions with a pulse repetition frequency, as determined by the slow clock 8, of about 20 Hertz. Secondly, the present device is in the display mode for about half of the time of an examination and during this time there is no ultrasonic energy administered to the subject since the slow clock is stopped.

We claim:

1. An echoencephalograph apparatus for determining the position of a particular structure within a patient's head comprising:
   transducer means adapted to be positioned on the surface of a patient's head to transmit an ultrasonic energy pulse therein and receive a group of echo pulses from structures within the head, said transducer means further adapted to convert said echo pulses to electrical echo signals;
   amplifier means coupled to said transducer means to amplify said echo signals, said amplifier having controllable gain means;
   first control means coupled to said controllable gain means and adapted to variably control the amplifier gain to compensate for ultrasonic pulse energy attenuation within the patient's head;
   gating means coupled to the output of said amplifier means, said gating means adapted to be open for a predetermined gating period to pass amplified echo signals which correspond to echoes from the region of said particular structure;
   sensing means coupled to the gating means and adapted to provide an output signal in response to a gated echo signal above a predetermined amplitude; and
   counter and display means controlled by said sensing means output signal and adapted to determine the travel time through the patient's head of the echo pulse represented by said gated echo signal above a predetermined amplitude and to display said travel time in terms of distance travelled.

2. An apparatus as claimed in claim 1 wherein said first control means includes first generator means to generate a ramp function output signal during said predetermined gated period to linearly increase the amplifier gain.

3. An apparatus as claimed in claim 2 which further includes:
   pulser means adapted to pulse said transducer means;
   first clock means to provide output pulse signals at a first frequency, said clock means adapted to provide frequency control pulses to control said pulser means and said first generator means.

4. An apparatus as claimed in claim 3 which further includes:
   second generator means to generate a ramp function output signal having a frequency lower than said first frequency, said second generator means output coupled to said controllable gain means to further linearly increase the amplifier gain, for a number of groups of echo signals, and said second generator means further coupled to said sensing means and adapted to be disabled by said sensing means output signal.

5. An apparatus as claimed in claim 4 wherein said first clock means is connected to said sensing means output and adapted to be disabled by said sensing means output signal.

6. An apparatus as claimed in claim 1 wherein said gating means includes means to vary said predetermined gating period.

7. An apparatus as claimed in claim 3 which further includes variable delay circuit means adapted to receive said frequency control pulses to synchronously enable said first generator means and said gating means after a predetermined time delay.

8. An apparatus as claimed in claim 7 which further includes:
   means connected to said variable delay circuit means to generate a set gate pulse; and
   switch means adapted to connect said set gate pulse means to said sensing means and disconnect said gating means from said sensing means.

9. An echoencephalograph apparatus for determining the position of a particular structure within a patient's head, comprising:

first clock means to generate pulses at a low frequency;

second clock means to generate pulses at a high frequency;

synchronizer means adapted to receive first and second clock pulses and provide output pulses at said low frequency, phase synchronized with the second clock pulses;

transducer means adapted to apply ultrasonic energy pulses to the surface of said head, to receive echo pulses from within said head, and to generate electrical pulses corresponding to said echo pulses;

means connected between said transducer means and said synchronizer means output and adapted to pulse said transducer means at said low frequency;

amplifier means coupled to said transducer means and adapted to amplify said electrical transducer pulses, said amplifier having controllable gain means;

gating means coupled to said amplifier means and adapted to pass amplified pulses in response to a gate width pulse;

sensor means adapted to generate an output pulse in response to an input pulse above a predetermined amplitude;

switch means having a first and second position, said switch means adapted to couple said gated pulses to said sensor means input when in the first position;

counter means having a first input connected to said second clock, a second input connected to said synchronizer means and a third input connected to said sensor means, said counter means adapted to start count of said high frequency pulses on the first counter input in response to a pulse on said second counter input and stop count in response to a pulse on said third counter input;

display means adapted to display the count on said counter means;

adjustable delay means coupled to said synchronizer means and adapted to provide delayed pulses at said low frequency;

gate generator means connected to said delay means and adapted to generate said gate width pulses at said low frequency on a first output and mid-gate pulses on a second output, said switch means adapted to connect said second output of said gate generator to said sensor means when in the second position; and first ramp generator means coupled between said first output of said gate generator means and said amplifier gain control means, said ramp generator adapted to generate a ramp function signal in response to each of said gate width pulses.

10. An apparatus as claimed in claim 9 which further includes:

a second ramp generator means to generate a cyclic ramp function signal having a frequency lower than said low frequency said second ramp generator coupled to said amplifier gain control means to cyclically increase the amplifier gain.

11. An apparatus as claimed in claim 10 which further includes means for applying said second ramp signal to said first ramp generator to control the amplitude of said first ramp signal.

12. An apparatus as claimed in claim 11 which further includes means adapted to disable said second ramp generator and said first clock for a predetermined duration in response to said sensor means output.

13. Method of determining the distance from the surface of a patient's head to a particular structure within the head comprising:

periodically applying an ultrasonic energy pulse to the patient's head;

sensing the resulting groups of echo pulses reflected from structure interfaces within said head;

converting the groups of echo pulses into groups of electrical echo signals;

variably amplifying the echo signals within each of said groups so as to compensate for ultrasonic energy attenuation within the patient's head;

gating a portion of each group of echo signals which corresponds to echoes from the region of said particular structure;

detecting the first echo signal above a predetermined amplitude from among the gated echo signals;

determining the travel time of the echo pulse represented by said detected signal; and converting said travel time into distance travelled through said head.

14. A method as claimed in claim 13 which further includes:

successively increasing the amplification of each successive group of echo signals until said echo signal of predetermined amplitude is detected.

* * * * *